Patented May 21, 1935

2,002,098

UNITED STATES PATENT OFFICE 2,002,098

EYE SHIELD

William K. Price, Yakima, Wash.

Application December 21, 1933, Serial No. 703,332

5 Claims. (Cl. 2—12)

My invention relates to goggles, and more particularly to those of the type suitable for use as glare shields arranged to intercept rays of light only from certain directions.

My invention is hereinafter described as employed for the purpose of shielding a driver's eyes from the light rays or head lamps of vehicles approaching at the driver's left, it being understood that in localities where the custom is to drive on the left, the shields will be reversed.

Goggles or glare shields have heretofore been employed for the purpose of intercepting light rays which are directed angularly to the driver's vision, but the shields have been open to the objection that they extended clear back to the goggle or eye-glass frame, with the result that an automobile driver's view to the left is obstructed. This is a feature which is, of course, highly objectionable at street intersections, or cross walks.

My invention has for its object the provision of a glare shield or eye-shield of such form that while the user may have practically unobstructed vision in a straight-ahead direction, his eyes are shielded from the light rays of vehicles approaching him along the roadway, while at the same time, side vision is not so greatly obstructed as to render use of the shield dangerous at street intersections and other dangerous locations.

Some of the forms which my invention may take are shown in the accompanying drawing, wherein Figure 1 is a rear view of the goggles; Fig. 2 is a plan view thereof, partially in section; Fig. 3 is a view taken on the line III—III of Fig. 2, and Fig. 4 shows a modification of the structure of Fig. 2.

The glare shields may be mounted on a suitable goggle or spectacle frame 5, which may be of any suitable type, and which may be provided with the usual lenses, or not, according to the needs of the user. The shields may also be mounted on frames suitable for attaching to spectacles or other eye-glasses of drivers who wear them.

The shields proper are indicated by the numeral 6, and may be of tinted celluloid or other suitable material. The shields may be fastened to the frame 5 by the use of cement, rivets, stitching, or in any other suitable manner.

As shown in Figs. 1 to 3, the strips are mounted on the frames to the left of the user's axial lines of vision, and are preliminarily shaped in such manner that when their ends are fastened to the frame 5, their forward glare-shielding portions 7 are angularly disposed relative to the plane of the frame 5, so that they will be more directly in the lines of light rays from vehicles approaching at the left. The portions 7 may be widened to a desirable degree. By reason of the loop shape of the strip 6, they permit the user to look to the left without turning his head to any considerable extent.

By reason of the arrangement shown therefore, it will be apparent that the user's vision directly ahead and to either the right or the left is not greatly obstructed and at the same time, his eyes are shielded from the glaring light rays of approaching vehicles. It will, of course, be apparent that the goggles are suitable for use by others than drivers of motor vehicles.

Referring now to Fig. 4, I show a glare shield strip 8, whose forward shielding portion extends in a direction parallel to the plane of the goggle frame instead of in inclined relation thereto as in the case of the shields 7.

I claim as my invention:—

1. Eye shield structure comprising a frame having vision openings, a strip-like shield device disposed forwardly of each opening, with its ends secured to the frame, and its mid-portion spaced forwardly of the frame, to permit sidewise vision between said portion and the frame, the shield device being bent through approximately 180°, and being disposed to one side of the axial line of vision.

2. Eye shield structure comprising a frame having a pair of vision openings, and a glare shield carried by the frame to one side of each axial line of vision and connected to upper and lower points on the frame, that portion of each shield intermediate its points of connection being spaced forwardly of the frame such distance as will permit sidewise vision between the shield and the frame.

3. Eye shield structure comprising a frame having vision openings, and a strip-like shield device disposed forwardly of each opening, with its ends secured to the frame and its mid portion spaced forwardly of the frame, to permit sidewise vision between said portion and the frame.

4. Eye shield structure comprising a frame having a vision opening, and a strip-like shield device disposed forwardly of said opening, with its ends secured to the frame and its mid portion disposed to one side of the axial line of vision and spaced forwardly of the frame to permit sidewise vision between said portion and the frame.

5. Eye shield structure comprising a frame having a vision opening, and a strip-like shield device disposed forwardly of said opening, with its ends secured to the frame and its mid portion disposed to one side of the axial line of vision and spaced forwardly of the frame to permit sidewise vision between said portion and the frame, the said mid portion of the shield being inclined relative to the plane of the frame, in a generally horizontal direction.

WILLIAM K. PRICE.

May 21, 1935.  E. SCHILKE  2,002,099
BATTERY TERMINAL
Filed Feb. 25, 1932
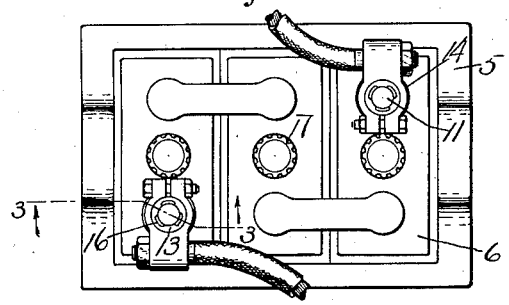
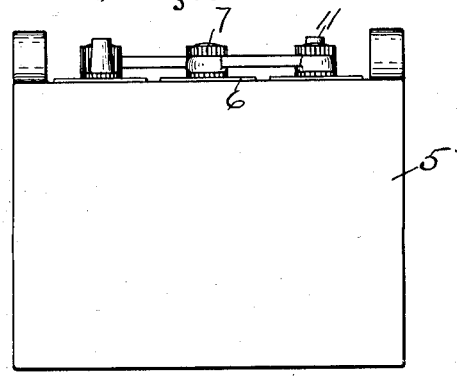
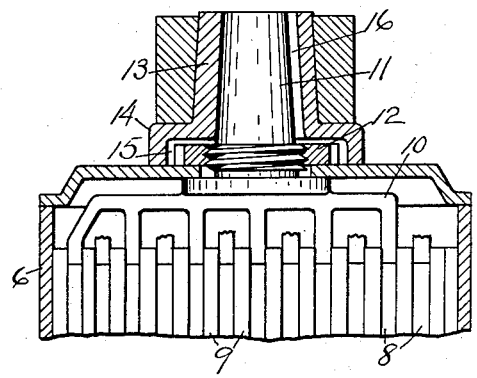
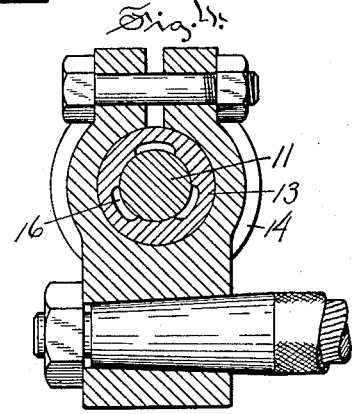
INVENTOR
Edward Schilke
by
Arthur Jenkins,
ATTORNEY